US007936677B2

(12) United States Patent  
Park

(10) Patent No.: US 7,936,677 B2
(45) Date of Patent: May 3, 2011

(54) SELECTION OF AN AUDIO VISUAL STREAM BY SAMPLING

(75) Inventor: Daniel J. Park, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 437 days.

(21) Appl. No.: 11/689,662

(22) Filed: Mar. 22, 2007

(65) Prior Publication Data

US 2008/0232250 A1    Sep. 25, 2008

(51) Int. Cl.
*G08C 15/00*    (2006.01)
(52) U.S. Cl. ......................... 370/235; 370/234
(58) Field of Classification Search .................. 370/235, 370/400, 395.21, 229, 230
See application file for complete search history.

(56) References Cited

U.S. PATENT DOCUMENTS

| 5,446,874 | A | 8/1995 | Waclawsky et al. | |
|---|---|---|---|---|
| 6,434,116 | B1 | 8/2002 | Ott | |
| 6,594,268 | B1* | 7/2003 | Aukia et al. | 370/400 |
| 6,678,248 | B1* | 1/2004 | Haddock et al. | 370/235 |
| 6,829,643 | B1* | 12/2004 | Tobe et al. | 709/226 |
| 7,042,888 | B2 | 5/2006 | Berggreen | |
| 7,120,114 | B1* | 10/2006 | Miyamoto | 370/230 |
| 7,296,288 | B1* | 11/2007 | Hill et al. | 726/2 |
| 2004/0170127 | A1* | 9/2004 | Tanaka | 370/235 |
| 2004/0240453 | A1* | 12/2004 | Ikeda et al. | 370/395.21 |
| 2005/0069215 | A1* | 3/2005 | Awano | 382/252 |
| 2006/0212917 | A1 | 9/2006 | Boucher et al. | |
| 2006/0285013 | A1* | 12/2006 | Lee et al. | 348/515 |
| 2007/0127410 | A1* | 6/2007 | Guo et al. | 370/328 |
| 2007/0171928 | A1* | 7/2007 | Kim et al. | 370/412 |
| 2007/0177626 | A1* | 8/2007 | Kotelba | 370/468 |
| 2007/0248100 | A1* | 10/2007 | Zuberi et al. | 370/395.41 |
| 2007/0286074 | A1* | 12/2007 | Xu | 370/230 |

FOREIGN PATENT DOCUMENTS

| EP | 1 729 447 A1 | 12/2006 |
|---|---|---|
| GB | 2 377 117 A | 12/2002 |
| JP | 2001-285296 | 10/2001 |
| WO | WO 2006/004556 | 1/2006 |

OTHER PUBLICATIONS

Japanese Office Action from Patent Application No. 2008-052339 mailed Mar. 23, 2010.

\* cited by examiner

*Primary Examiner* — Ricky Ngo
*Assistant Examiner* — Rasheed Gidado
(74) *Attorney, Agent, or Firm* — Michael Blaine Brooks, PC; Michael B. Brooks

(57) ABSTRACT

The embodiments of the present invention provide for methods, devices, and systems for providing quality of service to network data that is received by an intermediate node in a local area network. In some embodiments, network data is categorized based on data flow, and based on such data flow, determining whether such flow exceeds a threshold. If the flow exceeds a threshold, such data flow is accordingly provided quality of service.

20 Claims, 5 Drawing Sheets

SELECTION OF AN AUDIO VISUAL STREAM BY SAMPLING

FIELD OF THE INVENTION

The embodiments of the present invention relate to streaming audiovisual data in a shared network, particularly to providing quality of service to such streaming data within a network.

BACKGROUND

Internet access, as well as access to digital content, is currently available. For example, consumers may request on-demand movies streamed from the Internet to one of their television sets in their local area network for viewing. Networks where such streaming audiovisual source contents are transported, however, are typically shared such that different source content types may be delivered via such shared networks. Data that gets delivered via this shared network may include web browser data, such as web pages, file transfer protocol (FTP) data, streaming audiovisual data, and other data, which may include control information. Furthermore, such a shared network may include varying technologies, such as Ethernet and Powerline Communication technologies. A consumer wishing to view streaming audiovisual or multimedia data, particularly movies, over a shared network is typically desirous of wanting the audiovisual data to be delivered with a certain level of quality so as to provide a decent viewing quality. Ways of providing quality of service to such streaming data are thus highly desirable.

SUMMARY

In one aspect, a method of providing quality of service in a network is provided. The method includes the steps of receiving, within a sampling period, a set of network data comprising one or more data flows; reading, from said network data, one or more data flows within said sampling period; categorizing said read one or more data flows into one or more categories, wherein each of said read one or more data flows is associated with a category from said one or more categories; and for said each category of said one or more categories: determining an estimated average data flow bandwidth for said category based on said one or more data flows associated with said category; and if said determined estimated average bandwidth for said category is greater than a defined threshold then requesting quality of service for said category.

In another aspect, an intermediate node device adapted to be connected to one or more devices via a network, comprising one or more network segments, is provided. The intermediate node includes a communication module and a Quality of Service Determination and Processing (QOSDP) module. The communication module is adapted to enable said intermediate node to communicate to said one or more devices via said network. The QOSDP module is adapted to: receive via said network, within a sampling period, a set of network data comprising one or more data flows; read, from said network data, one or more data flows within said sampling period; categorize said read one or more data flows into one or more categories, wherein each of said read one or more data flows is associated with a category from said one or more categories; and for said each category of said one or more categories: determine an estimated average data flow bandwidth for said category based on said one or more data flows associated with said category; and if said determined estimated average bandwidth for said category is greater than a defined threshold then request quality of service for said category.

In another aspect, a system is provided. The system includes a network comprising one or more network segments, an intermediate node, and a rendering device. The intermediate node device is adapted to be connected to the rendering device via said network. The intermediate node includes a communication module and a Quality of Service Determination and Processing (QOSDP) module. The communication module is adapted to enable said intermediate node to communicate to said one or more devices via said network. The QOSDP module is adapted to: receive via said network, within a sampling period, a set of network data comprising one or more data flows; read, from said network data, one or more data flows within said sampling period; categorize said read one or more data flows into one or more categories, wherein each of said read one or more data flows is associated with a category from said one or more categories; and for said each category of said one or more categories: determine an estimated average data flow bandwidth for said category based on said one or more data flows associated with said category; and if said determined estimated average bandwidth for said category is greater than a defined threshold then request quality of service for said category. The rendering device is adapted to receive said set of network data.

BRIEF DESCRIPTION OF THE DRAWINGS

The embodiments of the present invention are illustrated by way of example and not limitation in the figures of the accompanying drawings, and in which.

DETAILED DESCRIPTION

Figure 1:
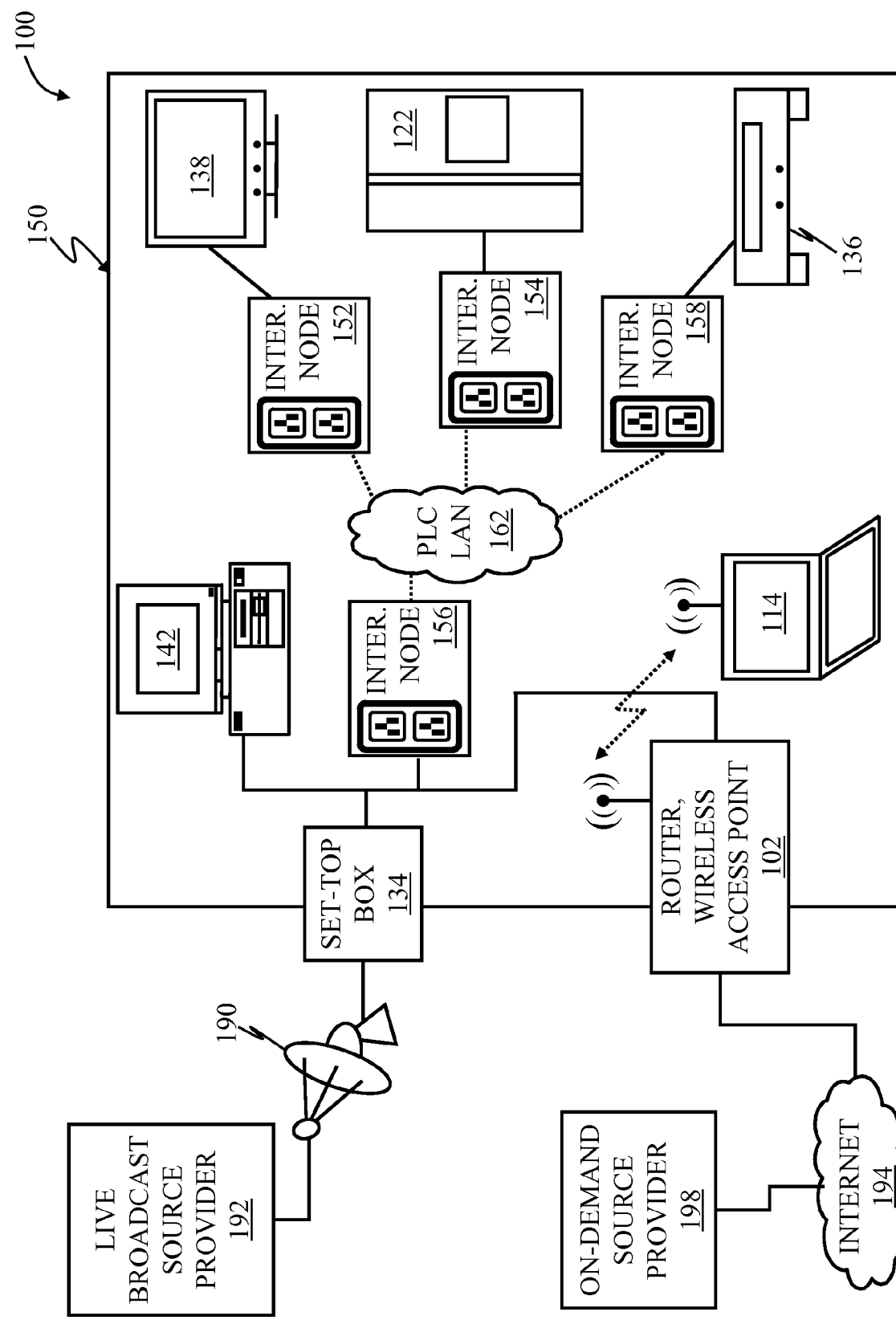
FIG. 1 is a high-level block diagram of an exemplary data communication system according to an embodiment of the invention.
Figure 2:
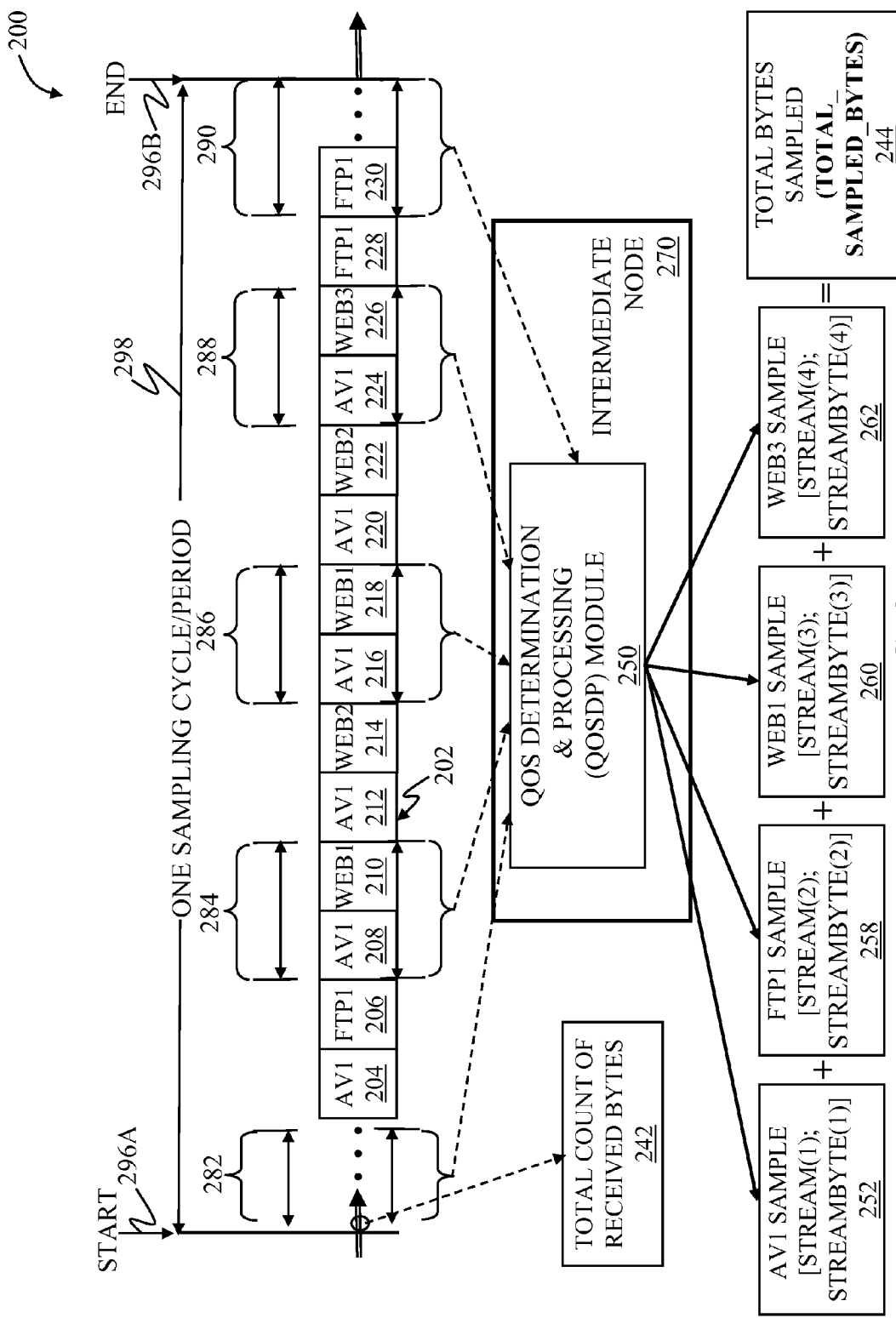
FIG. 2 is a high-level block diagram representing streaming network data with a representation of a sampling cycle, and a process that may be performed on such data, according to an embodiment of the invention.

To better understand the figures, reference numerals within the one hundred series, for example, 100 and 152, are initially introduced in FIG. 1, reference numerals in the two hundred series, for example, 202 and 250, are initially introduced in FIG. 2, and so on and so forth.

The embodiments of the present invention generally relate to identifying streaming source contents or media, such as audiovisual data, streaming visual data, streaming audio data, and streaming multimedia data. Streaming media in general is the transfer of source content so that this content may be received as a continuous real-time stream. Streamed source content elements are typically transmitted by a sender, e.g., a server/server application or sender entity, and received by a receiver, e.g., client/client application or receiver entity. The receiver or client typically may start presenting or playing back the source content as soon as the receiving client application has sufficient data or content elements stored in its receiving buffer. Typically, the client/receiver is simultaneously receiving streaming network data and presenting such streamed network data.

FIG. 1 is a diagram of an exemplary system 100 wherein streaming audiovisual or multimedia digital contents, such as audio and/or visual/image data, are transmitted via one or more networks according to some embodiments of the invention. In this exemplary embodiment, a local area network (LAN) 150 shares bandwidth among the various nodes in the system 100. The various nodes in the system may include senders or sources of data, receivers or clients of data, and intermediate nodes, such as network adapters. In general, a network adapter of the present invention is an intermediate node that converts data from one network technology to another, so as to enable communication between different network types. Furthermore, the intermediate nodes, including network adapters, of the present invention are stand-alone devices or modules that typically do not have access to powerful processors of general-purpose computers, such as Personal Computers (PCs). Examples of such network adapters may include adapters adapted to enable communication between different types of network segments, such as between Ethernet and Intermediate Node 152, 154, 156, 158, Ethernet and wireless, such as conforming to the 802.11g specification, and Ethernet and ultra wideband. The network adapters 152, 154, 156, 158, exemplified in FIG. 1, provide conversion and communication between an Ethernet network and a PLC network 162, in general. In some embodiments, the stand-alone network adapters of the present invention are deployed in pairs to transfer data over different network segment types of the LAN. For example, there is a source device, e.g., a source device set-top box 134, an Ethernet to a PLC stand-alone network adapter 156, the PLC network 162, a PLC to Ethernet stand-alone network adapter 152, and the destination device, e.g., a digital television (DTV) 138.

The exemplary system 100 may also include a number of consumer electronics, including a set-top box 134, a DTV 138, a wireless personal computer (PC) 142, a digital video or versatile disc (DVD) player 136, a computer laptop 114, gateways/routers 102, a consumer appliance/device 122, and one or more intermediate nodes 152, 154, 156, 158 connected via various network links or segments. Such network segments may also be wired or wireless and may be adapted to support various protocols. These various consumer electronics are typically adapted to be networked with each other. Examples of consumer appliances that may be networked into the system 100 include televisions and refrigerators with user interfaces, including displays, radios adapted to receive streaming source contents, and any other devices adapted to receive source contents via the network and present them accordingly. The local area network 150 may be adapted to support one or more network types—e.g., power line communication (PLC) networks, 802.11a wireless networks, 802.11g wireless networks, 802.11b wireless networks, and Ethernet networks. The local network 150 may also be operably coupled to one or more external source content providers 192, 198, for example, via satellite, cable, and/or terrestrial broadcast 190 or via an external wide area network, such as the Internet 194. Typically, the LAN 150 is coupled to external networks via one or more end-point or edge nodes, such as gateways and/or routers 102. A source content provider 192, 198 may provide pre-encoded and stored source content and/or live or real-time encoded source content to be streamed and received by a receiver/client and accordingly be presented in a user interface.

In some embodiments, audiovisual (AV) data, such as a movie, may be requested from a source provider 198 that provides on-demand pre-encoded and stored data and/or live data. Typically, the on-demand movie is presented on a presentation device after a small portion of the on-demand movie is stored in the appropriate buffer. For example, a streaming source content received from an external network or source may be received by a set-top box 134. The set-top box 134 then transmits the streamed audiovisual movie via one or more intermediate nodes, e.g., an Ethernet to PLC stand-alone network adapter 156 and/or a PLC to Ethernet stand-alone network adapter 152, to the digital television 138 for presentation. In other embodiments, the source of the streaming data may be within the LAN 150 itself, for example, from a computer 142 with a stored audiovisual file, e.g., a movie on a Digital Versatile Disk (DVD). The computer 142 may stream the stored AV file via intermediate node 156, then to intermediate node 152 to the operably coupled digital television set 138. The movie is typically presented on a presentation device when sufficient AV data is stored in an appropriate buffer, and typically while the buffer is still receiving other related AV data.

In some embodiments, the intermediate nodes of the present invention are nodes adapted to perform the quality of service (QOS) determination and processes described herein, but which do not function as network adapters. These intermediate nodes of the present invention, in general, sample the network data and accordingly provide QOS to certain types of data flows.

For intermediate nodes in a shared network, the embodiments of the present invention provide for a low-complexity means of identifying which network data flows may potentially carry streaming source content, particularly AV data or multimedia data, that typically requires a certain bandwidth requirement. Furthermore, because the quality of service determination and processing module process of the present invention is generally of low-complexity, a low-power and typically inexpensive processor may be incorporated in the exemplary intermediate node of the present invention. By identifying these streaming source contents that may require quality of service (QOS), these source contents may accordingly be provided special handling so as to provide a certain level of quality, typically thereby enhancing a consumer's experience. The embodiments of the present invention also provide exemplary intermediate nodes, such as network adapters, that are adapted to potentially identify streaming source content data, particularly AV and multimedia data, typically without external signaling or out-of-band communication, and without sampling or reading all network data or traffic crossing such intermediate node.

FIG. 2 is an exemplary diagram 200 illustrating an exemplary representation of network data 202 delivered over a shared network 150 and a manner in which network data may be processed according to an embodiment of the invention. This exemplary network data 202 may be received and processed by exemplary intermediate nodes 152, 154, 156, 158. The shared network 150 is adapted to transport various source contents with varying source content types. In this example, the network data 202 includes a number of source contents with different varying source content types, such as audiovisual data, file transfer protocol (FTP) data, and three separate web pages data. The audiovisual (AV) source content is a streaming source content data that is divided into a number of AV data elements, e.g., AV1 elements 204, 208, 212, 216, 220, 224. These AV data elements 204, 208, 212, 216, 220, 224 are all related to each other and associated with a source content or data flow category. The FTP source content is also divided and delivered as a number of FTP data elements, e.g., FTP1 elements 206, 228, 230. The various web page source contents are also delivered as a number of web page data elements, e.g., WEB1 210, 218, WEB2 214, 222, and WEB3 226. Such web page data, for example, may include source contents delivered in response, for example, to a hypertext transfer protocol (HTTP) get request. Other various source content types may also be delivered, but not shown, such as acknowledgement messages, control data, round-trip time messages, and other data types that may be delivered via a shared network. In general, a streaming source content is distinguished from a non-streaming source content, by the manner in which streaming source content is received and processed at the client, as known to those of ordinary skill in the art. A non-streaming source content is generally a source content that is typically downloaded in its entirety prior to being presented to a user. For example, a downloaded movie or AV data, however, is different from streaming AV data typically because the movie may not be played back or presented until the entire AV file is first downloaded. Web pages are typically considered non-streaming source contents.

Network data 202 delivered via network segments of the network may cross an exemplary intermediate node embodiment 270 of the present invention. The intermediate node 270 may be a device used to forward or transfer traffic from one LAN segment to another LAN segment, where the LAN segments may or may not be of the same type. The intermediate node transports network data, which may include AV source content. This intermediate node 270, in addition, for example, to performing network adapter functions is also able to sample data crossing such node 270, determine which data may potentially be streaming source content data, and those determined to be potentially streaming source content be assigned a certain level of quality of service. In some embodiments, network data received by such intermediate node are sampled based on a sampling cycle or period. For example, the intermediate node may sample network data received by such node once every second or other longer or shorter time interval. The duration of the sampling period and/or the frequency of the sampling period may be based on conditions, such as resources available at the intermediate node. The intermediate node 270 may have a Quality of Service (QOS) determination and processing (QOSDP) module 250 adapted to identify and categorize the various source contents being transported across this network node. Furthermore, the QOSDP module 250 or another module in the intermediate node may also determine or keep track of the total size of data elements receive or total count of bytes received 242 within a sampling period 298, e.g., keep track of the total count of received bytes 242 during that sampling period or cycle.

In this exemplary embodiment, a sampling period 298 typically has a start time 296A and an end time 296B. Furthermore, the sampling period may be divided into multiple test intervals 282, 284, 286, 288, 290, such that network data are sampled only during such test intervals 282-290. These test intervals may be defined, for example, as 30 samples or packets per second or 50 samples/packets per second. The total size of source content elements or data flows sampled generally is the summation of the sizes of related elements sampled during these intervals 282, 284, 286, 288, 290.

The embodiments of the present invention may also apply when a sampling period 298 is extended over a long period, for example, over several seconds. Such a sampling period may also have varying and/or big gaps between test intervals. For example, a sample period 298 may extend over five seconds, wherein there are test intervals defined in the first, third, and fifth second, but no test intervals between the second and fourth second. In other embodiments, there may be one sampling period, wherein such a sampling period contains only one test interval, and wherein that test interval is the same size as the sampling period 298. Furthermore, variations, on the manner of defining a sampling period and/or defining test intervals are expected and still be within the scope of the present invention.

As mentioned, the QOSDP module 250 is designed to categorize the various source content elements received during a sampling period into one or more categories or data flows 252, 258, 260, 262. For example, data sampled that are identified as part of AV1 source content 208, 216, 224, FTP1 source content 230, WEB1 source content 210, 218, and WEB3 source content 226 are accordingly grouped and their total sample sizes accumulated as shown. In this example, although WEB2 data elements 214, 222 are part of the network data 202 received by the intermediate node 270, WEB2 elements are not sampled during this exemplary sampling period. Furthermore, other source content elements (282, 204, 206, 212, 220, 228, portion of 290) are shown not sampled during this exemplary sampling period.

In some embodiments, a source content is transmitted as one or more packets. In this embodiment, the QOSDP module 250 reads the one or more packets 282, 284, 286, 288, 290 received at the intermediate node 270 during the sampling period and accordingly extracts or reads from each packet the header information. From the packet header information, each packet is categorized, based for example, to which data flow the packet may be associated or related. In some embodiments, the QOSDP module 250 may categorize the various packets, for example, by their unique packet header fields, such as EtherType, Source Internet Protocol (IP) address, Destination IP address, source Port, and Destination Port. EtherType is typically a field indicating the protocol being applied to transport the packet. In some embodiments, a data flow is a stream of correlated packets originating from a specific source and being delivered to one or more destinations. Typically, these flows have the same source and destination address, and other criteria in common, originating from a single session and/or multicast session. In other embodiments, the packets are correlated if they are based on or are associated with the same source content, e.g., all sampled AV1 packets 208, 216, 224 are grouped under the same data flow or category, e.g., represented by STREAM(1). Typically, the manner of categorizing the network data to one or more data flows may depend on the protocol being employed in transmitting the network data. In such embodiments, the QOSDP 250 may have the various logic and/or processes built-in so as to enable the QOSDP to read network data and accordingly categorize, which may include parsing and extracting data from the network data, to particular data flows or categories.

In addition, the total size or byte counts of the exemplary grouped sampled AV1 data are also accordingly accumulated or added together, for example, under a total bytes variable per category—STREAMBYTE(1). The variable STREAMBYTE(1) may contain, for example, the value of the byte counts of the first sampled AV1 208+byte counts of the second sampled AV1 216+byte counts of the third sampled AV1 224. In general, related packets or source content elements are thus grouped into a common category and their sizes accumulated. For example, the sampled FTP1 packet 230, the sampled WEB1 packets 210, 218, and the sampled WEB3 226 packet are all categorized under respective categories, e.g., represented by STREAM(2), STREAM(3), and STREAM(4) categories, and their total byte counts for each category or group are also accumulated under exemplary variables, e.g., STREAMBYTE(2), STREAMBYTE(3), and STREAMBYTE(4), respectively. The accumulated byte count, STREAMBYTE(i), for the identified data flow or category, in some embodiments may be used as a basis or indicator of the average sampled bandwidth for that data flow. Such an average sampled bandwidth, in some embodiments, may be based on having a sample size that may be deemed statistically significant. A sample size may be deemed statistically significant using conventional statistical or mathematical algorithms or formulas. In other embodiments, the QOSDP 250 may be configured to sample a defined sample size. This defined sample size may be preconfigured and/or dynamically be changed. In other embodiments, a confidence test formula may be applied.

In some embodiments, the total size or byte counts of all sampled packets 252, 258, 260, 262 during that sample period may also be maintained or kept track of, for example, in a variable or memory location exemplified and called herein as TOTAL_SAMPLED_BYTES 244. The byte count of each packet may relate to the entire packet size, which includes header and payload information, for example. In other embodiments, the sample byte counts may relate only to the size of the payload area of each packet. In this example, the value of TOTAL_SAMPLED_BYTES may be obtained by adding STREAMBYTE(1)+STREAMBYTE(2)+STREAMBYTE(3)+STREAMBYTE(4). Once categorized and total category sample size for each category is determined, the QOSDP module 250 may then determine which of these data flows or categories are then accordingly designated for QOS processing.

In general, the QOSDP has access to information that indicates both header size and payload size. In some embodiments, this information may be obtained by directly reading the packets. In other embodiments, such information may be obtained via a hardware support, e.g., an interface chip that may have a hardware register that indicates or measures the physical packet length. A sample size thus may be based on total packet size, but preferably payload packet size. The full or entire packet size, however, is typically used to determine the total bytes per second on the LAN, or total bytes received in the sampling period 242.

Figure 3:
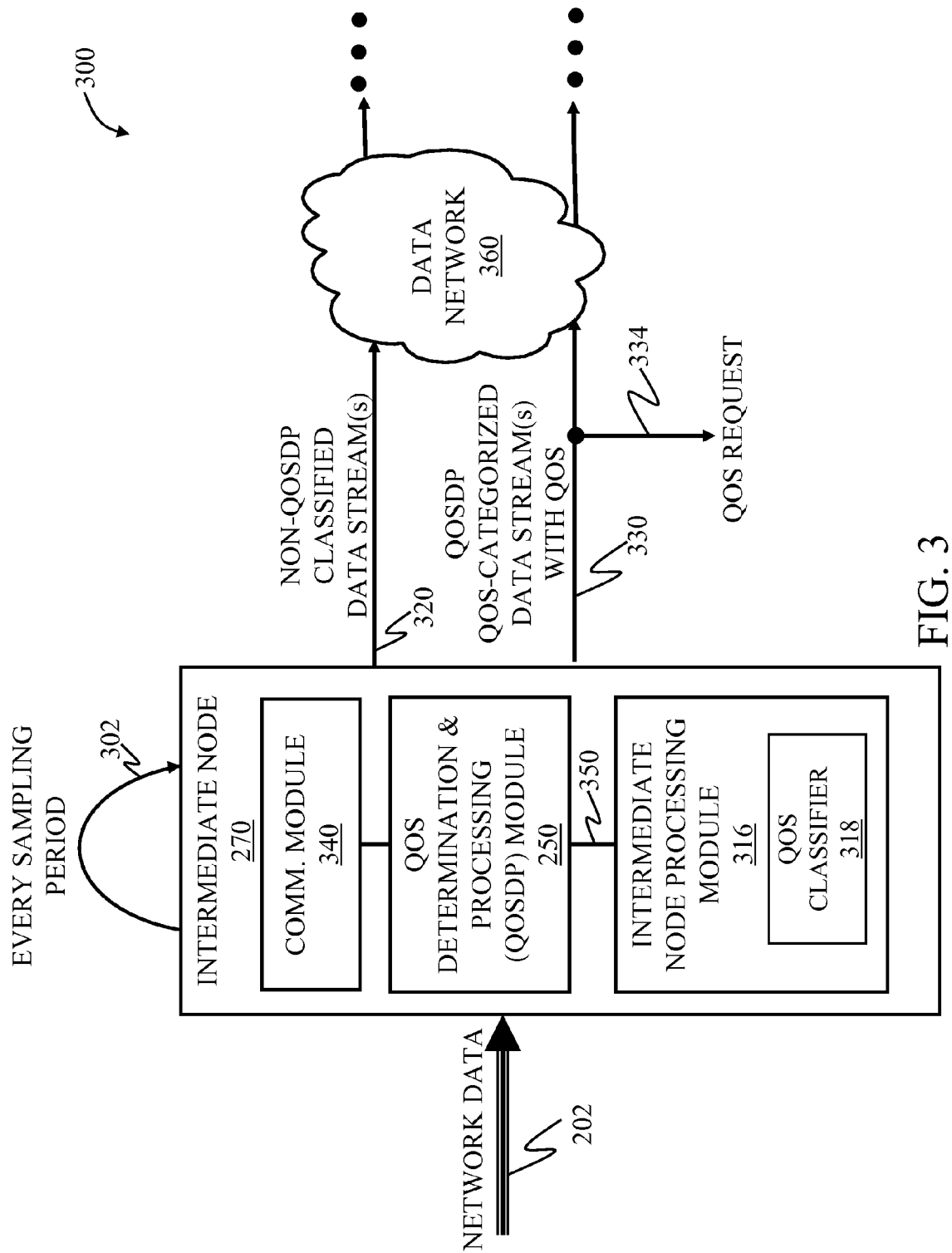
FIG. 3 is a high-level data flow illustrating a manner of assigning quality of service (QOS) to a data flow, according to an embodiment of the invention.

FIG. 3 is another exemplary diagram 300 showing a high-level data flow of an embodiment of the present invention. Network data 202, which may include a number of different source content data or data flows, received by an intermediate node 270 are sampled every sampling period 302 by the QOSDP module 250. The sampling period, e.g., when to perform or the duration of the QOSDP process described herein, may be user-, programmatically-, and/or manufacturer-defined. The sampling period may also be changed based on certain conditions, such as network conditions or resources available at the intermediate node. In some embodiments, the sampling period may be based on the number of packets sampled from the inbound network data 202 over time, which may be based on processing resources available.

An intermediate node 270 of the present invention may include a QOSDP module 250 and an intermediate node processing module 316 assigned to perform the conventional functions of this intermediate node. For example, if this intermediate node is an Ethernet to PLC adapter, the intermediate node processing module 316 is adapted to perform conventional Ethernet to PLC adapter functions 316, as well as the QOSDP processes described herein. Typically, these modules 250, 340, 316 may communicate with each other via a shared memory, a data line, a bus, dedicated signal paths, or one or more channels 350. Furthermore, these two modules may be embodied in hardware, as a set of program instructions, e.g., software, or both, i.e., firmware. Other modules may also be included, e.g., a communication module 340 adapted to enable the intermediate node 270 to communicate via the network. Other modules may also be included, not shown, which may depend on other functions of the intermediate node 270.

The QOSDP module 250 categorizes the sampled network data to one or more categories or data flows, and provides some level of QOS to data flows categorized as QOSDP QOS data 330. Data designated as QOSDP QOS data 330 and those that are not, i.e., non-QOSDP data 320, are then accordingly transmitted via the network 360, so as to be transmitted to the designated receiving or client destination. Furthermore, once the header is extracted and/or network data identified, network data 202 processed by the QOSDP module 250 may immediately be available to the QOS classifier 318, which may be embodied as part of the intermediate node processing module 316. For those source contents identified as QOSDP QOS data 330, the QOSDP module 250 also may request QOS 334 to be assigned to that particular data flow or category.

Non-QOSDP data 320 are those network data that have been categorized by the QOSDP module 250 as not to be provided specialized QOS handling according to the embodiments of the present invention. These non-QOSDP data 320 of the network data 202, however, may have been received by the intermediate node 270, particularly by the QOSDP module 250, with previous QOS or priority-handling services defined in their header. In some embodiments, these non-QOSDP data 320 may have been previously designated with best effort service. These non-QOSDP data 320 are thus typically provided the same service as they would have been provided if they did not undergo processing by the QOSDP module 250 of the present invention. These non-QOSDP data 320 thus are not assigned any QOS handling or processing of the present invention. No QOS requests are transmitted by the QOSDP module 250 on behalf of such non-QOSDP data 320.

Figure 4A:
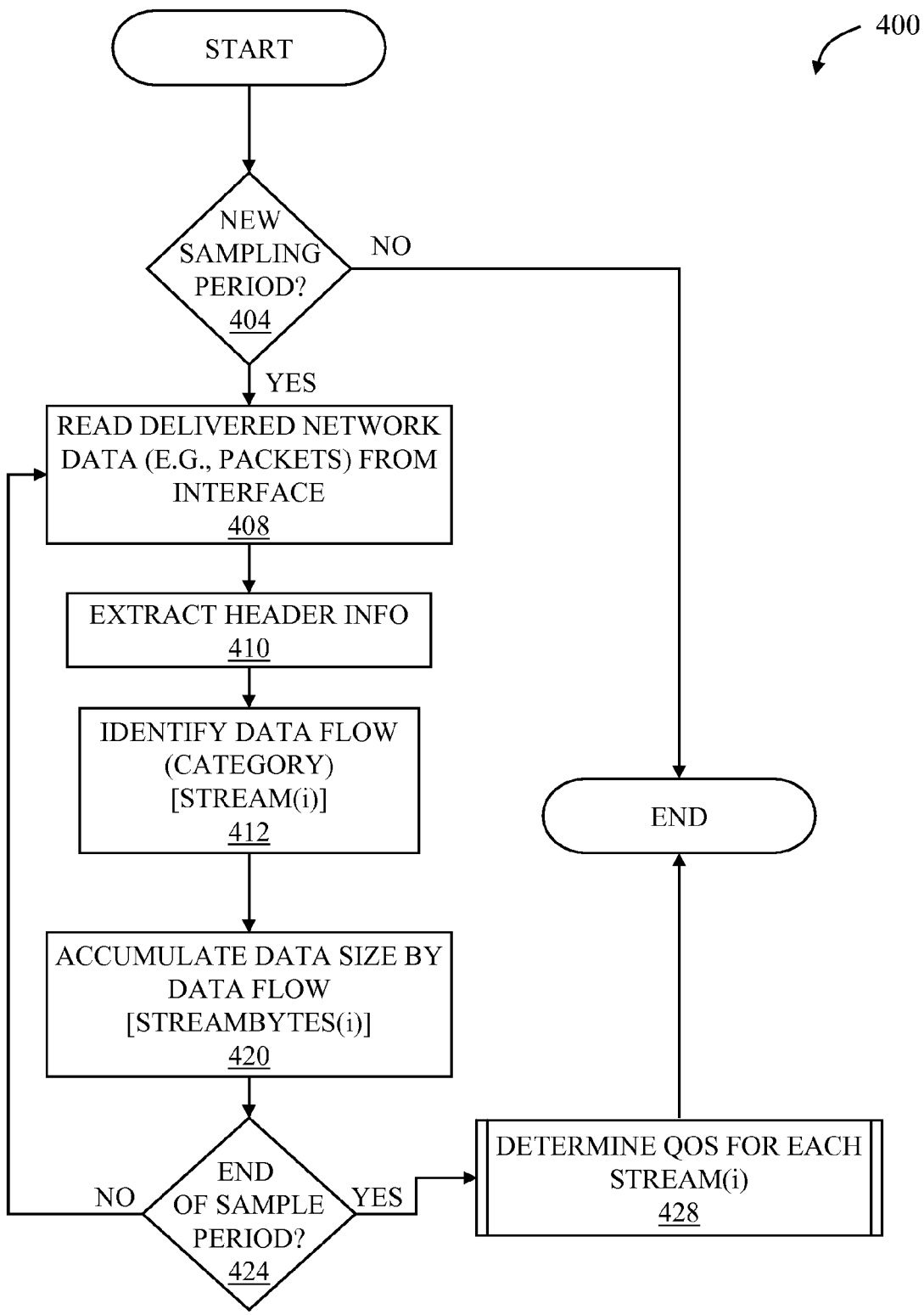
FIGS. 4A and 4B together illustrate an exemplary process of a Quality of Service determination and processing module, according to an embodiment of the invention.
Figure 4B:
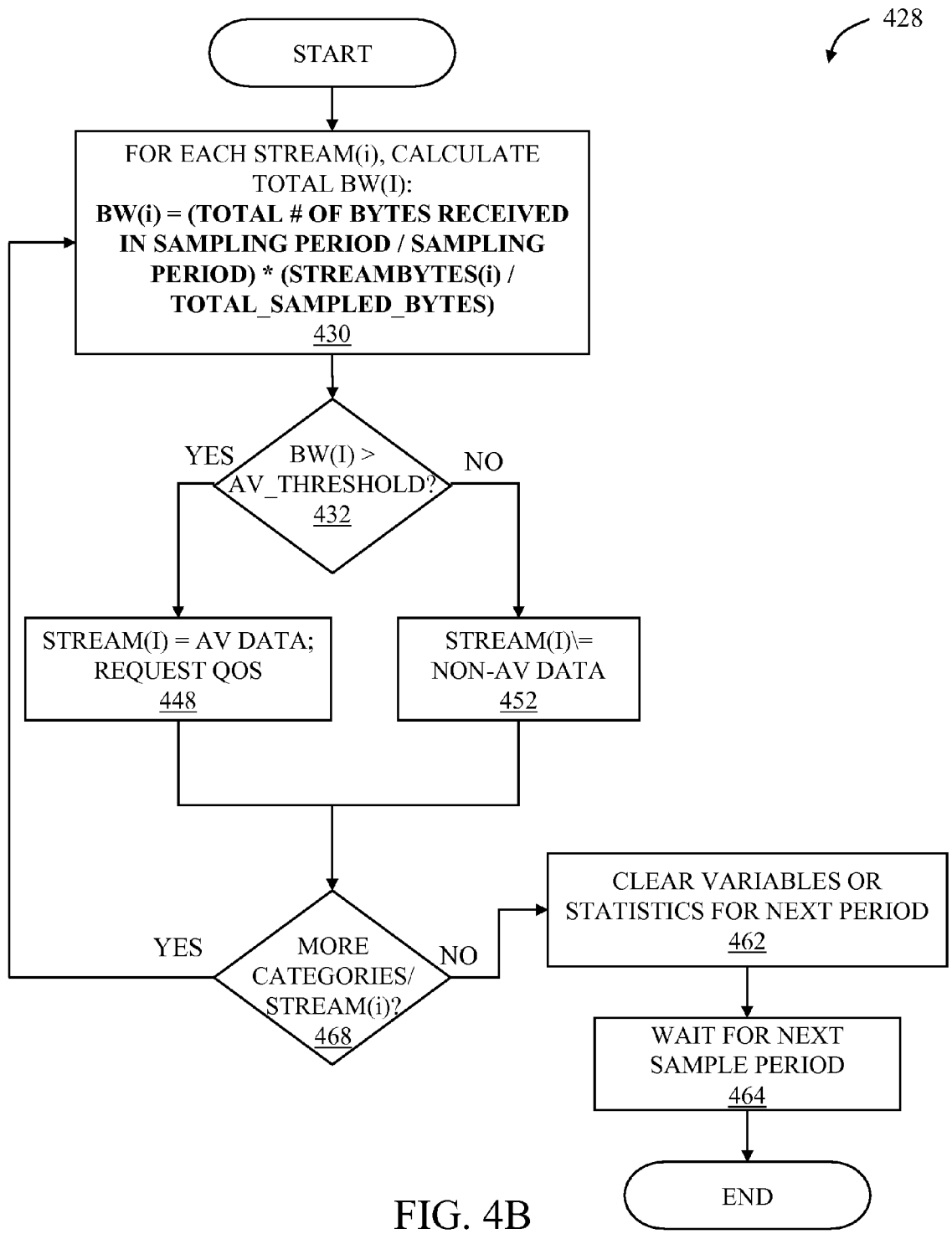

FIGS. 4A and 4B together illustrate a high-level flowchart of an exemplary QOSDP process 400 according to an embodiment of the present invention. In general, this QOSDP process 400 may be triggered by a monitoring module, not shown, that may be adapted to control when the sampling of the network data is to occur and/or the duration of the sampling period. In some embodiments, the monitoring and the triggering of the QOSDP process are embodied within the QOSDP module itself. The QOSDP process may also be triggered on-demand.

In general, a check is made if a new sampling period has occurred or needs to be triggered, e.g., it may be based on whether a scheduled time has arrived (step 404). During this sampling period, the QOSDP module 250, with or without interfacing with the intermediate node processing module 316, in general, reads or samples network data received by this exemplary intermediate node 270 via the appropriate interface(s) provided in the intermediate node (step 408). In some embodiments, such interface is at the PHY and/or media access control (MAC) level. For illustrative purposes, let us assume that the sampled data are in packets.

The network data is thus sampled and the header information of each sampled packet is then extracted (step 410). Based on the extracted or read header information, the various sampled packets are accordingly categorized or grouped into their respective categories or data flows (step 412), e.g., in a STREAM(i), in an array, in a data structure, or via other processes of categorizing such data. Furthermore, the byte count of each sampled packet is accordingly accumulated based on category (step 420), e.g., into an appropriate variable STREAMBYTES(i). Such a sampled byte count, as mentioned, may be the payload byte count or the entire packet byte count. The reading of the network data (step 408), extraction of header information (step 410), identifying the data flow or category (step 412), and byte count accumulation (step 420) are typically repeated until the end of that sampling cycle. Typically, sampled data are transmitted to the next destination, e.g., receiver or another node in the network, immediately after determination of their category or data flow and their byte counts (not shown). At the end of that sampling period (step 424, "yes" branch), for each source content category or flow, a QOS determination process (step 428) is then performed.

FIG. 4B illustrates an exemplary process 428 of this QOS determination process, which in general, may include performing a calculation for each category or data flow to determine an estimated total average bandwidth that may be required by such source content or data flow. In some intermediate devices, for example, such as PLC adapter for AV over Internet Protocol (IP) designed to transport AV traffic over a LAN, there is typically a high probability that any network data stream that exceeds a predetermined bandwidth value over the sampling period is streaming AV content.

The estimated average bandwidth attributed to any single stream or data flow category, e.g., represented as a BW(i) variable, may be defined as (step 430):

$$BW(i) = (\text{TOTAL \# OF BYTES RECEIVED IN SAMPLING PERIOD/SAMPLING PERIOD}) * (\text{STREAMBYTES}(i)/\text{TOTAL\_SAMPLED\_BYTES})$$

The total average bandwidth observed during the sampling period may be obtained by dividing the total number of bytes received by the intermediate node 270 during the sampling period divided by the sample period duration. This total number of bytes received during the sampling period may include sampled and non-sampled data received during this sampling period, e.g., all data packets received between the start 296A and end 296B of the sampling period. Typically, the total number of bytes received considers or is based on the entire packet size or total byte count for all packets received in the sampling period, which may include header and payload area, for example. In some embodiments, the total number of bytes received during the sampling period may be maintained as part of the conventional processing of the intermediate node processing module 316. In this embodiment, the total number of bytes received during the sampling period may be queried by the QOSDP 250 from the intermediate node processing module 316.

If the estimated average bandwidth for that data flow/category, BW(i), is greater than a defined threshold, AV_THRESHOLD, (step 432, "yes" branch) the source content or data flows associated with that average bandwidth is then assumed to be an AV stream and is assigned and defined to be a QOS data 330 (step 448), meaning that packets associated or conforming to such data flow or category, e.g., based on header information, are to be accordingly provided QOS, if possible. In other embodiments, the QOSDP module samples packets over several sampling periods, for example, to ensure that the BW is generally maintained for a period of time, prior to testing whether the bandwidth of a particular data category exceeds the average threshold (step 432).

The QOSDP 250 module in addition may request AV QOS status 334 from the network for this designated data flow (step 448), for example, based on unique packet header information. Future incoming network data that is associated with this category or data flow may thus be accordingly provided QOS. For example, if BW(1) is greater than the defined AV_THRESHOLD and BW(1) is associated with AV1 data 252, AV1 data packets conforming to the same data flow or header information are requested QOS priority handling 334.

In some embodiments, the QOS requirements or specification of the AV source content that crosses the intermediate node 270 may be known or be derived from the AV data flow itself. In some embodiments, the QOS requirements, e.g., reserved bandwidth, maximum jitter, error rate, and/or maximum latency period, may be configured in the intermediate node 270 of the present invention, such that the QOSDP is able to determine the level of QOS service to request for such a data flow. For example, such QOS parameters or requirements may be preconfigured, which may be based on data flows or data categories. In some embodiments, one or more sets of QOS parameters may be predefined or preconfigured in the intermediate node. Such a set of QOS parameters may also be dynamically changed and/or be user-configured. In other embodiments, there may be several sets of QOS parameters that may be selected or applied based on one or more conditions, e.g., the amount of BW detected.

In some embodiments, the defined average threshold, AV_THRESHOLD, may be based on the AV data type. For example, high definition AV data may be defined to have AV_THRESHOLD of 12 megabits per second (Mbps), while regular non-high definition AV data may be defined to have AV_THRESHOLD of 2 Mbps. The values listed are for exemplification purposes. Other AV_THRESHOLD values may also be defined and implemented. In some embodiments, the system 100 may be adapted to have multiple AV_THRESHOLD(s), depending on certain conditions, such as user expectation input, current network traffic, arrival time distribution, and/or detected network management traffic. Such AV_THRESHOLDs may be stored in a table or a database or be programmatically defined, for example.

A QOS request 334, for example, in a PLC network may be implemented by having the QOSDP module 250 define a connection specification for such a data flow or category and specifying parameters defining or configuring a manner in which such data flows coming in through the intermediate node 270 are to be handled. A QOS request may be sent to the MAC and/or PHY layer as a command, for example. Classifiers 318 and/or policy databases, for example, may accordingly also be updated based on such QOS requests. On the other hand, if the average bandwidth for that data flow or category is not greater than a defined threshold (step 432, "no" branch), the source content or packets associated with that data flow are not provided any special handling, e.g., such data flow/category is defined as non-AV data or non-QOSDP data (step 452) thus typically requiring no QOS handling of the present invention. These non-AV data are typically handled as if they did not undergo the QOS processing of the present invention.

Variables or memory locations used in this exemplary calculation may then be reset or cleared so as to prepare for the next sampling period and calculation (steps 462 and 464). The QOSDP process 400 described herein may be repeated at the next cycle.

It is possible that the QOSDP module 250 may incorrectly identify a non-AV data flow as AV data (step 448), according to the process described herein. This error, however, may typically be tolerated or acceptable due to the expectation that the exemplary intermediate device or node 270 of an embodiment of the present invention may be in a LAN configuration where there is a high probability that high bandwidth streams are AV streams. Furthermore, although granting or requesting AV QOS to an incorrect type of traffic or network data may steer resources away from other subsequent or incoming AV streams, such diversion of resources typically occur only for the duration of the incorrectly identified data flow. Most of the incorrectly identified flows, if non-AV data, are typically of relatively short duration, such as image downloads and file transfers. The duration of these flows are typically on the order of a few seconds to a few minutes where AV streams or source contents are typically of a longer duration, such as in the order of hours. Granting or requesting QOS to an incorrect type of traffic or network data is an error that may be acceptable to provide a low-complexity and/or a typically inexpensive intermediate node of the present invention. Such an error may further be alleviated, particularly, if the intermediate node is located in the network such that the intermediate node is directed to receive and transfer network data to potential rendering devices, e.g., those adapted to perform personal video recording or presenting type of functions.

Embodiments of the present invention may be used in conjunction with networks, systems, and devices that are adapted to employ intermediate nodes. Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. For example, one of ordinary skill in the art of programming may perform the exemplary processes described herein in a different order, use different memory locations and variables—e.g., as linked lists, data structures, and/or separate variable locations, and/or modify the steps performed, and yet still be in the scope of the present invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of providing quality of service by a processing module in a network, the method comprising the steps of:
    receiving, by the processing module, within a sampling period, a set of network data comprising one or more data flows;
    reading, from said network data, one or more data flows within said sampling period,
        wherein each of said read one or more data flows is associated with a flow size;
    categorizing said read one or more data flows into one or more categories, wherein each of said one or more categories is associated with a category size, wherein each of said read one or more data flows is associated with a category from said one or more categories, and wherein the step of categorizing further comprises the step accumulating said flow size of each read data flow into said category size associated with said read data flow; and
    for said each category of said one or more categories:
        determining an estimated average data flow bandwidth for said category based on said one or more data flows associated with said category, wherein a total sampled size is based on accumulating all of said each category size associated with said one or more categories, and wherein said determined estimated average data flow bandwidth for said category is based on (a total size of said network data received divided by said sampling period) multiplied by (said category size associated with said category divided by said total sampled size); and
        if said determined estimated average bandwidth for said category is greater than a defined threshold then requesting quality of service for said category.

2. The method of claim 1, wherein the step of categorizing is based on a set of header information of said read data flow.

3. The method of claim 2, wherein said header information comprises a protocol type, a source address, a destination address, a source port, and a destination port.

4. The method of claim 1, wherein each of said read one or more data flows is associated with a flow size based on a payload size.

5. The method of claim 1, wherein said total size of said network data received is based on an entire packet size, comprising packet header and packet payload.

6. The method of claim 1, wherein said defined threshold is 12 megabits per second.

7. An intermediate node device configured to be connected to one or more devices via a network, comprising one or more network segments, the intermediate node comprising:
    a communication module configured to enable said intermediate node to communicate to said one or more devices via said network; and
    a Quality of Service Determination and Processing (QOSDP) module adapted to:
        receive via said network, within a sampling period, a set of network data comprising one or more data flows;
        read, from said network data, one or more data flows within said sampling period;
        categorize said read one or more data flows into one or more categories, wherein each of said read one or more data flows is associated with a category from said one or more categories; and
        for said each category of said one or more categories:
        determine an estimated average data flow bandwidth for said category based on said one or more data flows associated with said category;
        determine a total sampled size based on accumulating all of said each category size associated with said one or more categories, and wherein said determined estimated average data flow bandwidth for said category is based on (a total size of said network data received divided by said sampling period) multiplied by (said category size associated with said category divided by said total sampled size); and
        if said determined estimated average bandwidth for said category is greater than a defined threshold then request quality of service for said category.

8. The intermediate node of claim 7, further comprising a network adapter processing module adapted to process said set of network data from a first network type to a second network type.

9. The intermediate node of claim 8, wherein said first network type is Ethernet and said second network type is PowerLine Communication.

10. The intermediate node of claim 7, wherein said QOSDP module is further adapted to categorize said read one or more data flows based on a set of header information of said read data flow.

11. The intermediate node of claim 10, wherein said header information comprises a protocol type, a source address, a destination address, a source port, and a destination port.

12. The intermediate node of claim 7, wherein each of said read one or more data flows is associated with a flow size, wherein each of said one or more categories is associated with a category size, and wherein said QOSDP module is further adapted to accumulate said flow size of each read data flow into said category size associated with said read data flow.

13. The intermediate node of claim 7, wherein each of said read one or more data flows is associated with a flow size based on a payload size.

14. The intermediate node of claim 7, wherein said total size of said network data received is based on an entire packet size, comprising packet header and packet payload.

15. A system comprising:
a network comprising one or more network segments;
an intermediate node device configured to be connected to a rendering device via said network, the intermediate node comprising:
   a communication module configured to enable said intermediate node to communicate to said one or more devices via said network; and
   a Quality of Service Determination and Processing (QOSDP) module adapted to:
   receive via said network, within a sampling period, a set of network data comprising one or more data flows;
   read, from said network data, one or more data flows within said sampling period;
   categorize said read one or more data flows into one or more categories, wherein each of said read one or more data flows is associated with a category from said one or more categories; and
   for said each category of said one or more categories:
   determine an estimated average data flow bandwidth for said category based on said one or more data flows associated with said category;
   determine a total sampled size based on accumulating all of said each category size associated with said one or more categories, and wherein said determined estimated average data flow bandwidth for said category is based on (a total size of said network data received divided by said sampling period) multiplied by (said category size associated with said category divided by said total sampled size); and
   if said determined estimated average bandwidth for said category is greater than a defined threshold then request quality of service for said category; and said rendering device adapted to receive said set of network data.

16. The system of claim 15, wherein said intermediate node further comprises a network adapter processing module adapted to process said set of network data from a first network type to a second network type.

17. The system of claim 16, wherein said first network type is Ethernet and said second network type is PowerLine Communication.

18. The system of claim 16, wherein said first network type and the second network are identical network types.

19. A method of providing quality of service by a processing module in a network, the method comprising the steps of:
   reading, by the processing module, from a set of network data, one or more data flows within said sampling period, wherein each of said read one or more data flows is associated with a flow size;
   categorizing said read one or more data flows into one or more categories, wherein each of said read one or more data flows is associated with a category from said one or more categories, wherein each of said one or more categories is associated with a category size, and wherein the step of categorizing further comprises accumulating said flow size of each data flow into said category size associated with said read data flow; and
   for said each category of said one or more categories:
   determining an estimated average data flow bandwidth for said category based on said one or more data flows associated with said category, wherein a total sampled size is based on accumulating all of said each category size associated with said one or more categories, and wherein said determined estimated average data flow bandwidth for said category is based on (a total size of said network data received divided by said sampling period) multiplied by (said category size associated with said category divided by said total sampled size); and
   if said determined estimated average bandwidth for said category is greater than a defined threshold then requesting quality of service for said category.

20. The method of claim 19, wherein each of said read one or more data flows is associated with a flow size based on a payload size.

* * * * *